J. B. BARTHOLOMEW.
STEERING MECHANISM FOR TRACTORS.
APPLICATION FILED MAY 4, 1917.
1,328,808.
Patented Jan. 27, 1920.
4 SHEETS—SHEET 2.
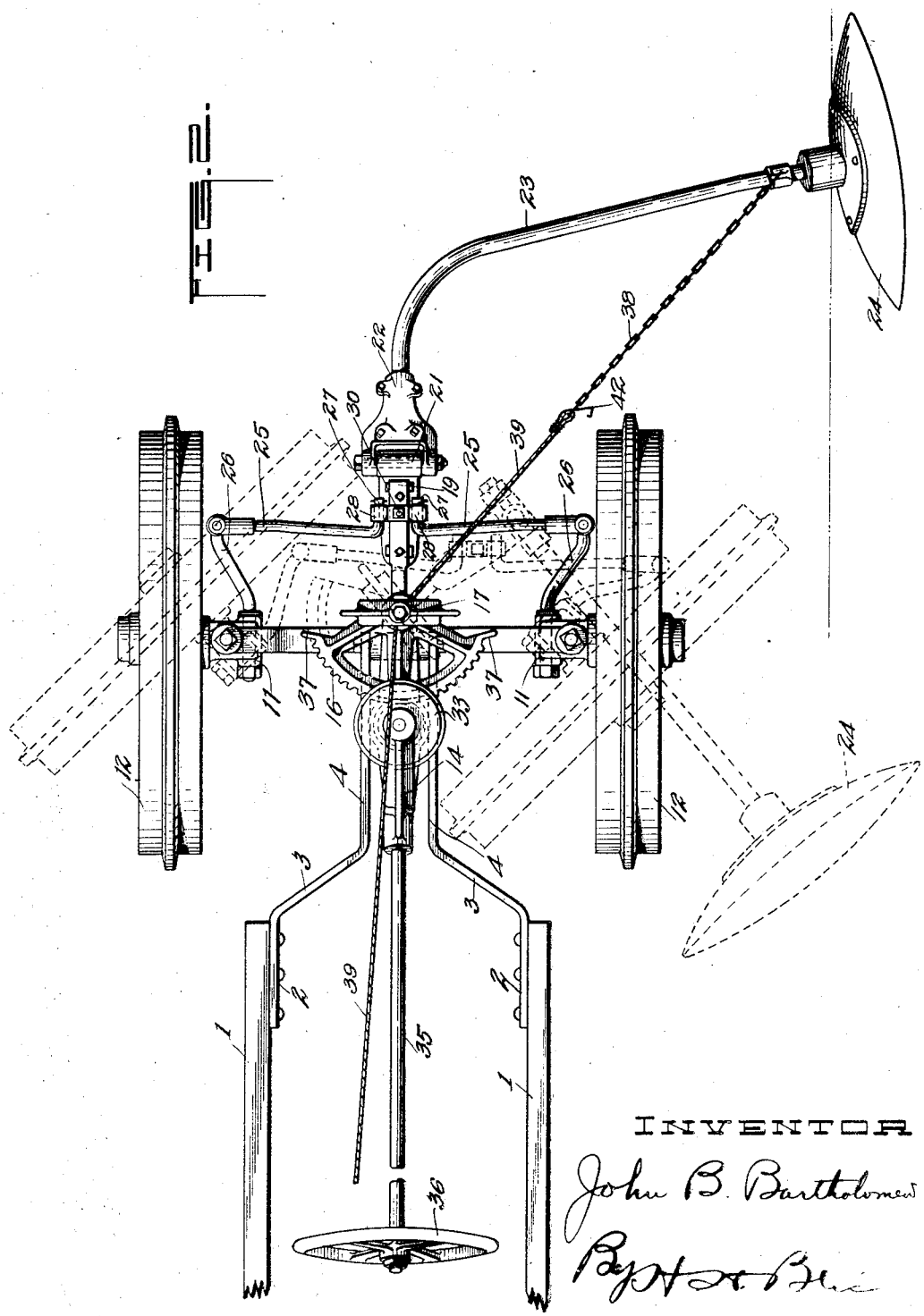
INVENTOR
John B. Bartholomew
By H. T. B.
ATTY

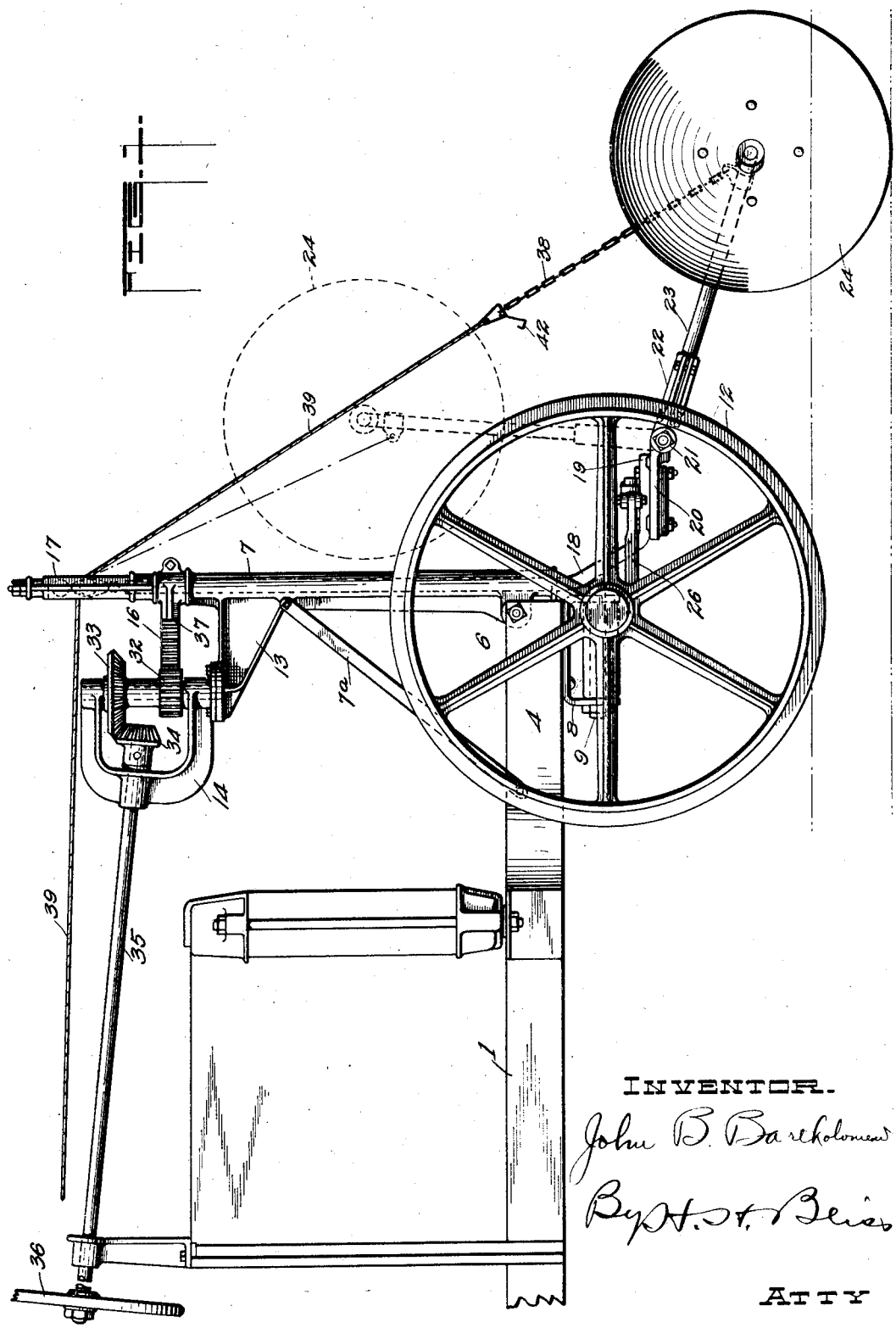

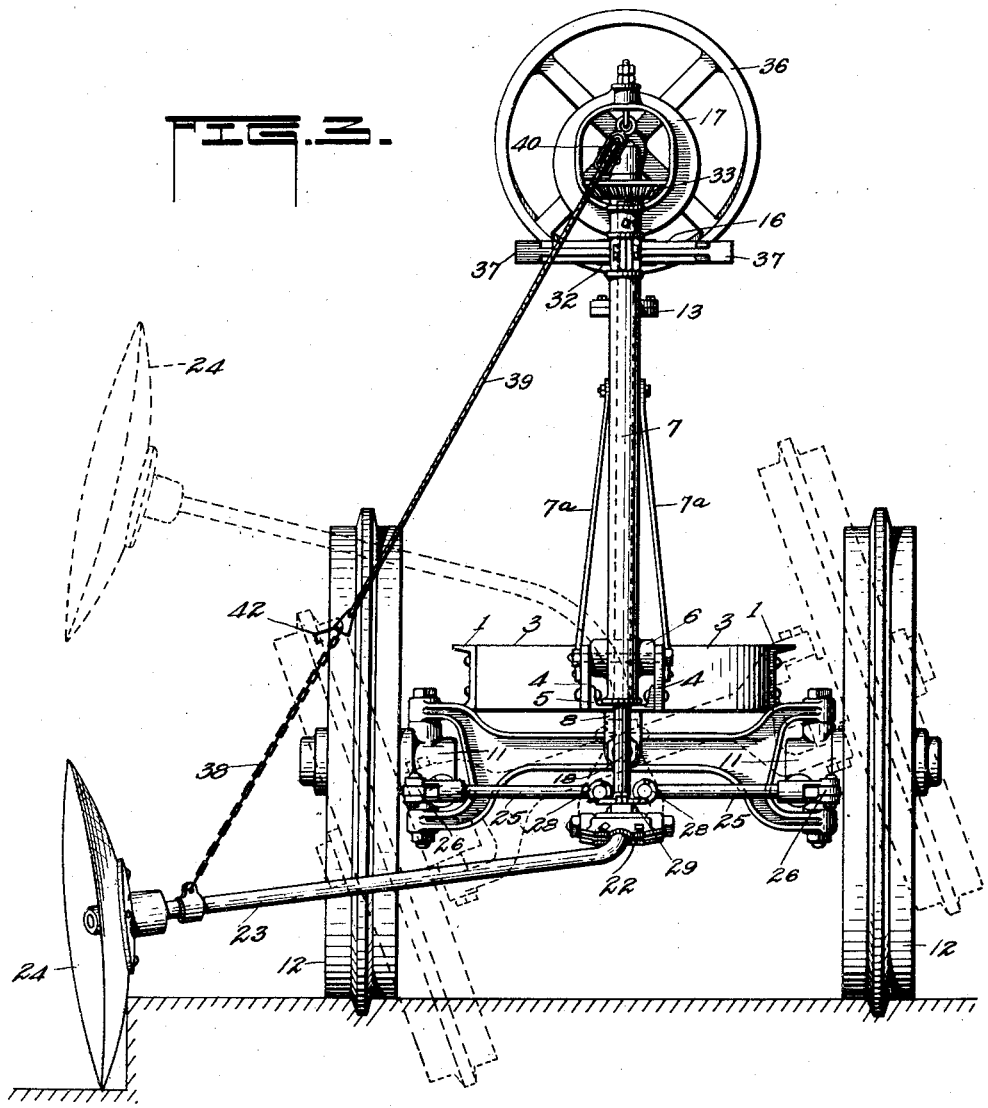

J. B. BARTHOLOMEW.
STEERING MECHANISM FOR TRACTORS.
APPLICATION FILED MAY 4, 1917.
1,328,808.
Patented Jan. 27, 1920.
4 SHEETS—SHEET 4.
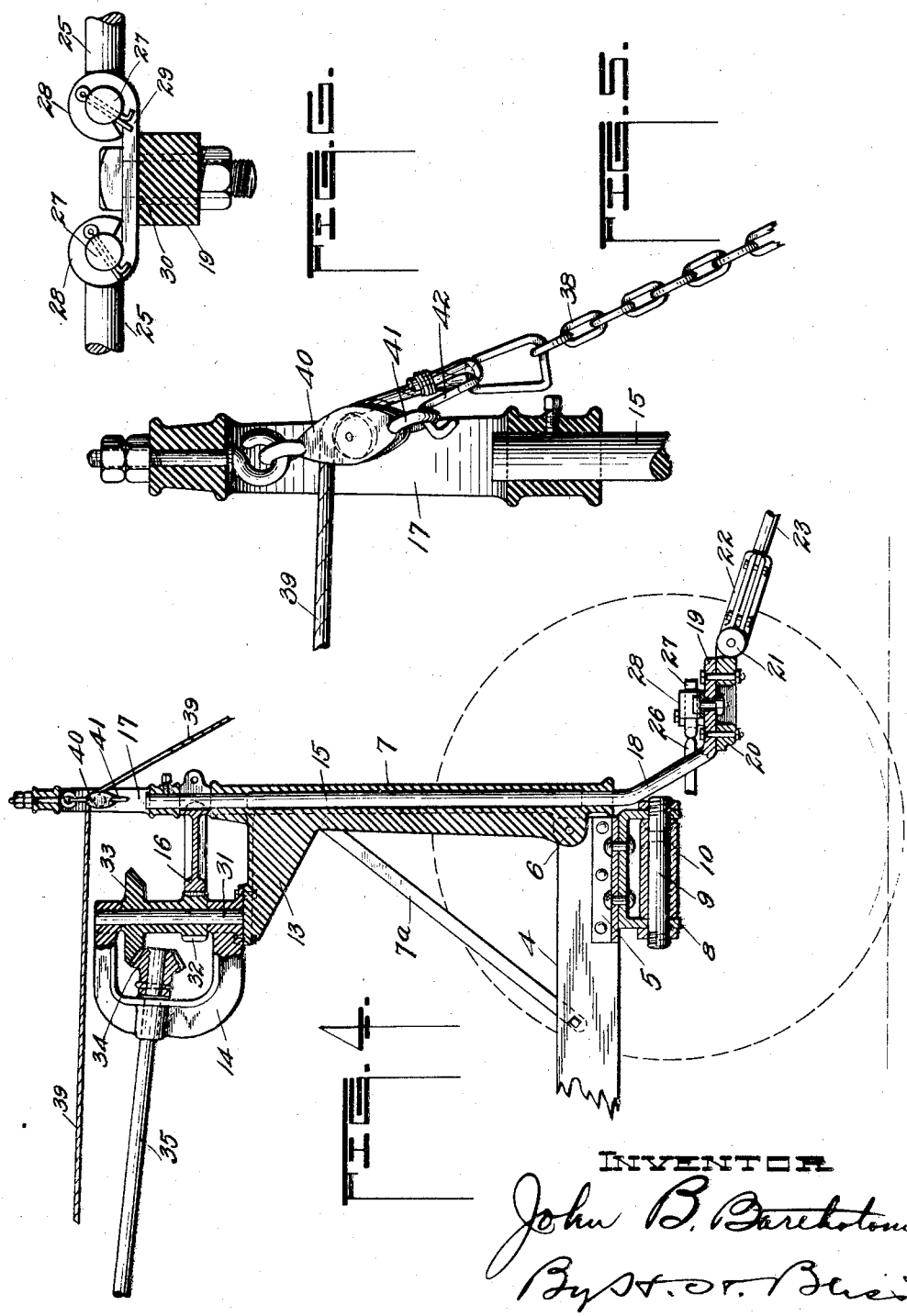
INVENTOR
John B. Bartholomew
By H. O. Bir
ATTY

UNITED STATES PATENT OFFICE.

JOHN B. BARTHOLOMEW, OF PEORIA, ILLINOIS, ASSIGNOR TO AVERY COMPANY, OF PEORIA, ILLINOIS, A CORPORATION OF ILLINOIS.

STEERING MECHANISM FOR TRACTORS.

1,328,808.      Specification of Letters Patent.      Patented Jan. 27, 1920.

Application filed May 4, 1917. Serial No. 166,370.

*To all whom it may concern:*

Be it known that I, JOHN B. BARTHOLOMEW, a citizen of the United States, a resident of Peoria, in the county of Peoria and State of Illinois, have invented new and useful Improvements in Steering Mechanism for Tractors, of which the following is a specification.

This invention has reference to the steering mechanism for tractors, and relates particularly to such a mechanism which includes a steering disk adapted to travel in a furrow cut by a soil engaging element forming a part of an implement drawn over the ground by the tractor.

One of the objects of the present invention is to improve the mounting for the steering mechanism of the tractor, to permit the turning of the steering wheels in the smallest possible space, and also, to provide a mounting for the steering wheels which will permit the same adapting themselves to the unevenness of the ground.

A further object of the invention is to improve the connections between the steering disk and the steering connections with the steering wheels, and to provide a means for raising the steering disk and to retain the same in a raised position.

The invention has for a further object to improve the steering mechanism operated by the tractor operator for turning the steering wheels, including gearing and a stop associated therewith for limiting the turning movement of the steering wheels.

Further objects and aims of the invention will appear in the following description and drawings forming a part thereof, in which—

Figure 1 is a side elevation of my improvements applied to the forward end of a tractor;

Fig. 2 is a plan view of Fig. 1;

Fig. 3 is an end view of Fig. 1;

Fig. 4 is a vertical cross-section showing certain details of the steering mechanism;

Fig. 5 is a detail showing the lifting and retaining means for the steering disk, and Fig. 6 is a detail showing a connection in the steering mechanism.

Like characters of reference denote corresponding parts throughout the figures.

1 designates a pair of parallel spaced, preferably channel beams forming the supporting bed or frame for the tractor, only the forward end of which is shown. The extreme forward portion of the tractor bed or frame upon which the steering mechanism is mounted and with which the steering wheels have a connection, includes the bars 2 which are suitably connected with the forward ends of the beams 1, having the converging portions 3 and the parallel closely spaced parts 4 of a suitable length. The forward ends of said bars 2 are united by means of the spacing block or casting 5 and also the bearing 6 formed on the vertically disposed tubular bearing 7. While I prefer that the parts 1 and 2 of the frame comprise beams and bars as shown, suitably connected, it is understood that the beams 1 may be bent into form to serve the purpose of the bars 2. The function of the narrow front frame construction described, is to make it possible, as shown in dotted lines in Fig. 2, to swing the steering wheels almost at right angles so as to make the shortest possible turn of the tractor. To the under side of the block or casting 5 is secured the strap iron 8 in which is fulcrumed by means of the pivot pin 9, the transverse beam 10 to the opposite ends of which are pivotally connected the steering knuckles 11, of a type which is common in automobile construction, and journaled on shaft extensions of said knuckles are the steering wheels 12. The beam 10 being pivotally connected with the bed or frame of the tractor, as shown, permits the same to oscillate in a vertical plane, see Fig. 3, and the steering wheels 12 thereby permitted to accommodate themselves to any unevenness of the ground, without straining or twisting the tractor frame.

The tubular bearing 7 to which reference has been made, extends up above the bed or frame of the tractor, is braced from the bed or frame by means of braces 7$^a$, and at or near its upper end is provided with the bracket 13, and mounted on said bracket 13 is a yoke bearing 14.

Journaled in said tubular bearing 7 is a shaft member 15, the upper end of which protrudes above the bearing 7 and on the upper end of said shaft is carried the toothed segment 16 and above said segment the yoke 17. The lower end of said shaft member 15 is preferably inclined downwardly and forwardly as at 18 and terminates in the preferably horizontally disposed bar section 19.

To the under side of the part 19 of the said shaft member 15 is secured a casting 20 formed on its outer end with a bearing 21 with which a casting 22 has a swiveled connection, and to said casting 22 is connected a rod or bar 23, which, in normal working position extends preferably slightly downwardly and then forwardly to one side and on the outer end thereof is journaled a steering disk 24, which is adapted to travel in a furrow formed by one of the soil engagement elements on the implement drawn by the tractor, to steer the tractor during its travel. The operator will guide the tractor during its first trip across a field drawing an implement, after which the steering disk 24 will follow a furrow to guide the tractor.

The steering wheel knuckles 11 are coupled together, whereby they may be turned in unison, by rods 25, the outer ends of which have a pivotal connection with crank arms 26 connected with said steering knuckles 11, and the inner ends of said rods 25 have preferably bent ends 27 hooked in eyes or loops 28 of a bar or casting 29 pivoted at 30 on the portion 19 of the shaft member 15.

Journaled in the yoke bearing 14, is a shaft 31 and on said shaft is carried a gear pinion 32 meshing with the toothed segment 16, and also a bevel gear wheel 33 which may be cast integrally with said pinion 32, or not, as may be desired. Meshing with the bevel gear wheel 33 is a bevel pinion 34 on the end of a shaft or stem 35, journaled in the yoke bearing 14 and extending back to within reach of the operator for the tractor has a hand steering wheel 36. The toothed segment 16 is preferably formed at opposite sides with the extended teeth segments or stops 37 having for their object, to prevent the disengagement of the teeth of the toothed segment 16 with the pinion 32 and to act as a stop to limit the turning movement of the steering wheels 12 when they have been turned to the position, approximately that shown in dotted lines in Fig. 2.

I have provided for not only lifting the steering disk 24 but to retain the same in an inoperative position when it is desired to move the tractor from one place to another, or whenever it is desired to use the tractor for other purposes than drawing a plowing or cultivating implement over a field. I accomplish this by means of preferably a link belt 38 connected with the outer end of the bar or rod 23 and which is coupled with a cable 39 passing over a pulley 40 and extending to within reach of the operator, at the hand steering wheel 36. The pulley 40 is suspended in the yoke 17, in manner best seen in Fig. 5, and said pulley has the ring 41 connected thereto into which may be hooked the hook 42, preferably connected to the link belt 38 and cable 39 where they are united. It is obvious that the operator drawing on the cable 39 may raise the steering disk 24 to an inoperative position, see dotted lines Fig. 3, and when he desires to retain the steering disk 24 raised, he may accomplish this result by hooking the hook 42 in the ring 41, in manner seen in Fig. 5.

In operation, the structure is designed primarily for drawing agricultural implements over a field and is intended particularly for use in drawing plows; however, the structure may be used for road purposes and for use wherever a tractor is desirable.

Assuming that a plow is attached to the tractor to be drawn over a field, the operator during the first trip across the field, will guide the tractor by means of the hand steering wheel 36 for the purpose of cutting the first row of furrows. After the first trip, the steering disk 24 is lowered so as to run in a furrow and to steer the tractor across the field, it being obvious that the connections between the rod or bar 23 and the steering knuckles 11 are such that lateral movement of the rod or bar 23 will be imparted to said steering knuckles 11 to steer the steering wheels 12. When the tractor reaches the end of the field, and it is desired to turn the tractor, the operator may, with one hand, pull back upon the cable 39 to raise the steering disk 24 through the connection of the link belt 38 therewith, and with his other hand, revolve the hand steering wheel 36 and through the connections described, with the steering wheels 12 turn the steering wheels into the approximate position shown in dotted lines in Fig. 2, the one or the other of the stops 37 on the toothed segment 36 engaging with the pinion 32 to limit the turning movement of said steering wheels, which will relieve the operator of any worry concerning the possible disengagement of the teeth of the segment 6 with the pinion 32. When the tractor has been turned to the correct position, the operator will lower the steering disk 24 into a furrow, which, as stated, will then steer the tractor across the field.

The construction of the forward end of the tractor frame, as previously pointed out, is made very narrow so as to permit the turning of the steering wheels 12 almost at right angles, as shown in Fig. 2, which will make it possible to turn the tractor in the smallest possible space.

Whenever it is desired to retain the steering disk 24 in an elevated position, when removing the tractor from the field or using it for road purposes, the hook 42 may be connected in the ring 41 of the pulley 40, as shown in Fig. 5, which will retain the steering disk in an elevated position.

The construction of the shaft member 15 and its operating connections, the hand steering wheel 36, the steering disk 24 and the steering knuckles 11 are such that the operator may steer the steering wheels from the hand steering wheels 36 with considerable ease and the steering of the steering wheels may also be easily facilitated through the travel of the steering disk 24 in the furrow. The pivotal connection of the bar or casting 29 with the lower forward portion of the shaft member 15 will permit the said shaft member to be turned to the extent shown in dotted lines in Fig. 2 for the purpose of turning the steering wheels 12, without cramping any of the connections between said shaft member 15 and the steering knuckles 11.

It is obvious that various changes may be made in the construction of the mechanism herein shown and described, without departing from the spirit and scope of the invention, and I reserve the right to make any such changes comprehended in the invention, defined by the claims appended hereto.

What I claim is:—

1. The combination of the frame having the centrally positioned forwardly projecting element, the front dirigible truck wheels, the vertically tilting axle beam carrying said wheels and pivoted to the front end of the said frame element, the centrally arranged bearing support secured to the front end of said frame element and extended upward to horizontal planes remote therefrom, the centrally arranged power transmitting devices connected to the truck wheels for steering them, the steering disk, the disk supporting arm pivoted to the said centrally arranged steering devices, and the centrally arranged means for lifting the steering disk.

2. In a machine of the character described, in combination, steering wheels, an upstanding shaft member, a member having a pivotal connection with the lower end of said shaft member, steering connections between said last member and said steering wheels, gearing including a hand steering wheel for operating said shaft member, a steering disk, a casting connected with the lower end of said shaft member, means supporting the steering disk and having a pivotal connection with said casting, and means for raising said steering disk and for retaining the same in a raised position.

3. In a machine of the character described, in combination, steering wheels, an upstanding tubular bearing, a shaft member journaled in said bearing and having a lower angular portion, a toothed segment connected with the upper end of said shaft member and provided with stops to limit the movement of said shaft, gearing including a hand steering lever operatively connected with said toothed segment, steering connections between the lower angular portion of said shaft member and said steering wheels, a steering disk, connections between said disk and said shaft member, and means for raising said disk and retaining the same in raised position.

4. In a machine of the character described, in combination, steering wheels, an upstanding tubular bearing, a shaft member journaled in said bearing, gearing including a hand steering wheel connected with the upper end of said shaft, a yoke also connected with the upper end of said shaft, a pulley suspended in said yoke and having a ring, steering connections between the lower end of said shaft member and said steering wheels, a steering disk, a pivotal connection between said disk and the lower end of said shaft, a cable passing over said pulley and connected with the disk for raising the same, and a hook connected with said cable and adapted to be hooked in the ring of the pulley for holding the disk raised.

JOHN B. BARTHOLOMEW.